Figure 1:
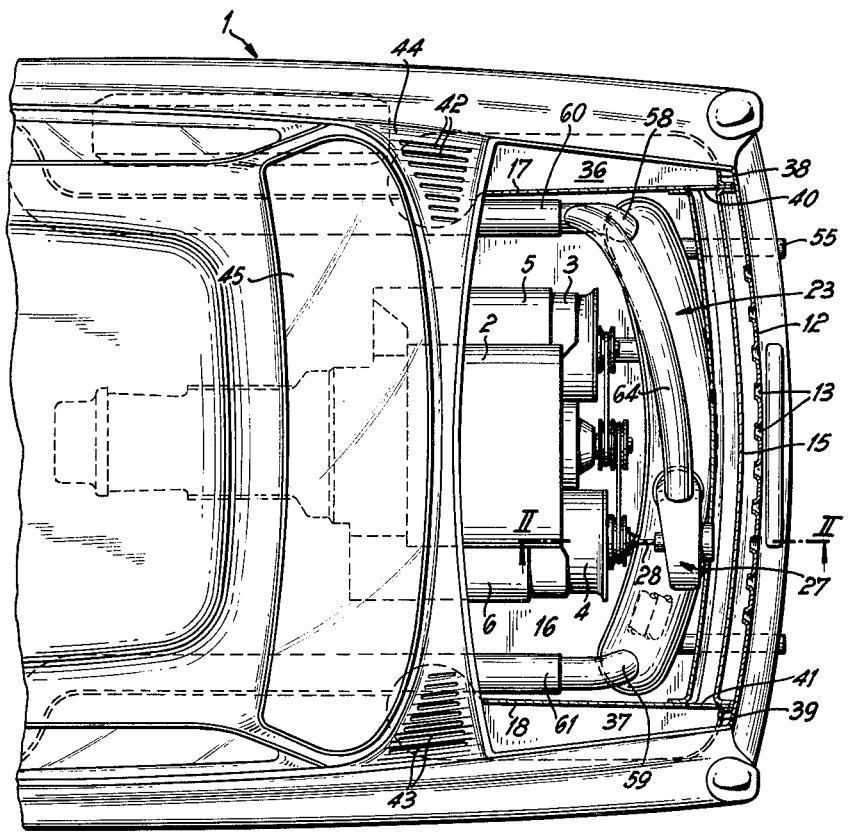

Sept. 21, 1965  R. BINDER  3,207,440
VEHICLE HEATING INSTALLATION
Filed June 13, 1962  3 Sheets-Sheet 1

INVENTOR
Robert BINDER
BY Dicke + Craig
ATTORNEYS

Sept. 21, 1965  R. BINDER  3,207,440
VEHICLE HEATING INSTALLATION
Filed June 13, 1962  3 Sheets-Sheet 3

INVENTOR
Robert BINDER
BY Dicke + Craig
ATTORNEYS

United States Patent Office 3,207,440
Patented Sept. 21, 1965

3,207,440
VEHICLE HEATING INSTALLATION
Robert Binder, Schwieberdingen, Germany, assignor to Dr. Ing. h.c. F. Porsche K.G., Stuttgart-Zuffenhausen, Germany
Filed June 13, 1962, Ser. No. 202,224
Claims priority, application Germany, June 27, 1961, P 27,439
12 Claims. (Cl. 237—12.3)

The present invention relates to a heating installation for vehicles, especially in motor vehicles, which a blower belonging to the heating system supplies to enclosure means comprised in the vehicle body the air heated by the exhaust gases of the internal combustion engine.

It is known in the prior art with air-cooled, internal combustion engines to provide, in addition to the blower supplying cooling air for the internal combustion engine, an additional blower which supplies fresh or heated air into the enclosure means for passengers carried by the vehicle. According to one proposal for a prior art construction, the cooling air blower is arranged on one side and the blower for the passenger enclosure ventilation on the other side of the internal combustion engine coaxiallly to the crankshaft. The last-mentioned blower is thereby structurally combined with the fly-wheel of the internal combustion engine whereby the housing for the fly-wheel is simultaneously constructed as blower housing and air-guide system. The fresh air supplied by the blower is heated by the exhaust gases of the internal combustion engine. For that purpose, a heat-exchanger is inter-connected in the exhaust gas line. The construction in such prior art arrangement of the exhaust gas line, and more particularly its construction directly behind the combustion space of the internal combustion engine as heat exchanger is by no means advantageous as within this area relatively high gas velocities are present in the exhaust gas line and the back-pressure of a heat-exchanger has an unfavorable effect on the gas exchange of the internal combustion engine. Similarly, the arrangement of the heat-exchanger laterally of the internal combustion engine is disadvantageous for the accommodation thereof within the vehicle as the accessibility to the internal combustion engine is impaired thereby. With the known prior art construction, the internal combustion engine is arranged in the rear of the vehicle so that additional difficulties arise in connection with the air guidance. The cross sections of the lines cannot be dimensioned sufficiently large since the structural parts of the motor vehicle as well as the drive unit and axle unit are in their way in a hindering and obstructing manner. In particular, the further characteristic that in such prior art arrangement the heated air has to be deflected behind the heat-exchanger by 180° in the direction toward the passenger space produces, by reason of lack of adequate space, sharp bends, i.e., connecting lines having a small radius of curvature, which considerably increase the flow resistance within the heating line.

These disadvantages are avoided in accordance with the present invention by arranging the blower at the free end of the internal combustion engine and by supplying fresh air by means of this blower along an exhaust-gas muffler constructed as a heat-exchanger which is disposed directly below the blower. The use of the exhaust-gas muffler as a heat-exchanger at the free end of the internal combustion engine enables, as compared to the known constructions, a simple air guide system having relatively slight flow resistances which in no way impairs the accessibility to the internal combustion engine. Simultaneously therewith, the need for an additional separate heat-exchanger unit is obviated in accordance with the present invention since this is realized in accordance with the present invention by the exhaust-gas muffler that is already present. Such an exhaust-gas muffler constructed as a heat-exchanger, however, does not impair the flow within the exhaust-gas line by reason of its additional function. An advantageous construction for the heater-blower is made possible with air-cooled, internal combustion engines by the fact that the blower is arranged coaxially to the cooling-air blower of the internal combustion engine and directly in front thereof—as viewed in the direction toward the corresponding vehicle end—and is drivingly connected with the cooling-air blower by a flexible shaft. It is possible, by the use of such elastic drive connection to compensate advantageously, during installation of the heater-blower for variations in the dimensions, as well as equalize rotational speed fluctuations. Suction lines are coordinated, in a manner known per se, to the cooling-air blower and to the blower of the heating installation whereby the air reaches the cooling-air blower through slots provided in the outer walls of the motor vehicle body adjacent to this blower and the air is guided to the heater-blower through lines formed by parts of the vehicle body or frame. A particularly advantageous and appropriate structure results when a cross-bearer member of the vehicle frame or of the vehicle body of a self-supporting type body construction which is arranged in the area of the rear end of the vehicle is constructed as a bearer member having a closed cross section and forms the air line leading to the blower. The cross-bearer member is in communication with the air-guide system extending inside of the wheel housing and formed by the inner wheel housing walls and by an additional pressed or stamped part, which air-guide system is connected with an air inlet aperture provided in the upper wall of the outer body panels of the vehicle body. By such an arrangement, the construction and accommodation of the fresh air-guide system to the heater-blower is realized with few additional parts that do not change the assembly conditions of the vehicle.

The exhaust-gas muffler constructed as a heat-exchanger consists of two half-shells having a cylindrical base form of which only one-half shell serves as a heat-exchanger surface. As a result thereof, the manufacturer of the heat-exchanger surface is facilitated as the same can be made independently of the other half-shell and may be connected with the other half-shell only during the final steps of the manufacturing operation. The separating plane of the half-shells is thereby located advantageously in the horizontal plane, and the heat-exchanger surface is constituted by the upper half-shell. The upper half-shell is made, as compared to the lower half-shell, of a material having considerably greater strength. There is achieved by such a construction a simple and relatively inexpensive safeguard of the heat-exchanger surface against the formation of cracks so that a penetration of the exhaust gases into the heated air space or into the passenger space is avoided with certainty. Additionally, the connections of the exhaust manifolds and exhaust lines at the muffler as well as the damping channels within the muffler are provided and secured exclusively at the lower half-shell so that the heat-exchanger surface is free of any connections or dangerous welding spots.

Moreover, the exhaust-gas muffler is curved toward the passenger space in an arcuate shape whereby not only an advantageous adaptation thereof to the body shape is achieved, but also the flow of the heated air through the muffler constructed as a heat-exchanger is favored thereby.

Accordingly, it is an object of the present invention to provide a fresh and/or heated air ventilation and heating installation for vehicles, particularly air-cooled motor vehicles, which avoids the aforementioned disadvantages encountered in the prior art constructions in an effective manner and by simple means.

It is another object of the present invention to provide a heating installation for vehicles, especially motor vehicles, in which the thermal energy of the exhaust gases is used to heat fresh air without, however, impairing the gas exchange of the internal combustion engine by unfavorably influencing the relatively high gas velocities present in the outlet manifold thereof by any back-pressure that may be produced by the requisite heat-exchanger.

A further object of the present invention resides in the provision of a fresh air ventilation and heating installation for motor vehicles of the type described hereinabove which does not impair the accessibility to the engine or engine parts thereof.

A further object of the present invention resides in the provision of a fresh air ventilating and heating installation for motor vehicles, particularly motor vericles provided with an air-cooled rear engine, which permits the use as well as ready accommodation of ventilation and heating lines of relatively large cross section without the need of sharp bends in these lines that would increase the flow resistance.

Another object of the present invention resides in the provision of an exhaust-gas muffler constructed as a heat-exchanger which is so constructed and arranged as to provide, by its location directly below the blower housing, a space-saving arrangement.

Still a further object of the present invention resides in the provision of a drive arrangement for a heating blower of a fresh air ventilation and heating installation of a motor vehicle having an air-cooled, internal combusition engine in which an elastic drive connection is provided between the cooling air blower and the heating blower to thereby compensate for inaccuracies in manufacture as well as during installation of the heating blower and to thereby equalize rotational speed fluctuations.

Still a further object of the present invention resides in the provision of a fresh air heating and ventilating installation for motor vehicles in which the air lines are appropriately constituted by parts of the frame or body of a self-supporting type body to minimize the need for additional separate air ducts.

A further object of the present invention resides in the provision of an exhaust-gas muffler construction as a heat-exchanger which facilitates manufacture and assembly thereof, assures by simple and inexpensive means against the formation of cracks in the heat-exchanger surface, and removes from the heat-exchanger surface any connections or welded seams and welded places that may endanger the safety of operation thereof as regards the possibility of penetration of exhaust gases into the heating system through cracks that may form in the heat-exchanger surface.

A further object of the present invention resides in the provision of an exhaust-gas muffler so constructed as a heat-exchanger and matched to the external contour of the vehicle body as to favorably affect the flow of the heated air through the heat-exchanger provide a more ready accommodation of the muffler in the vehicle and ensure a better space utilization, in particular with a rear-engine vehicle.

Still a further object of the present invention resides in the provision of a fresh air heating and ventilation installation for motor vehicles, especially air-cooled, rear-engine vehicles in which the air inlets for the fresh air installation are located within a zone that is relatively free of road dirt and road dust.

Figure 2:
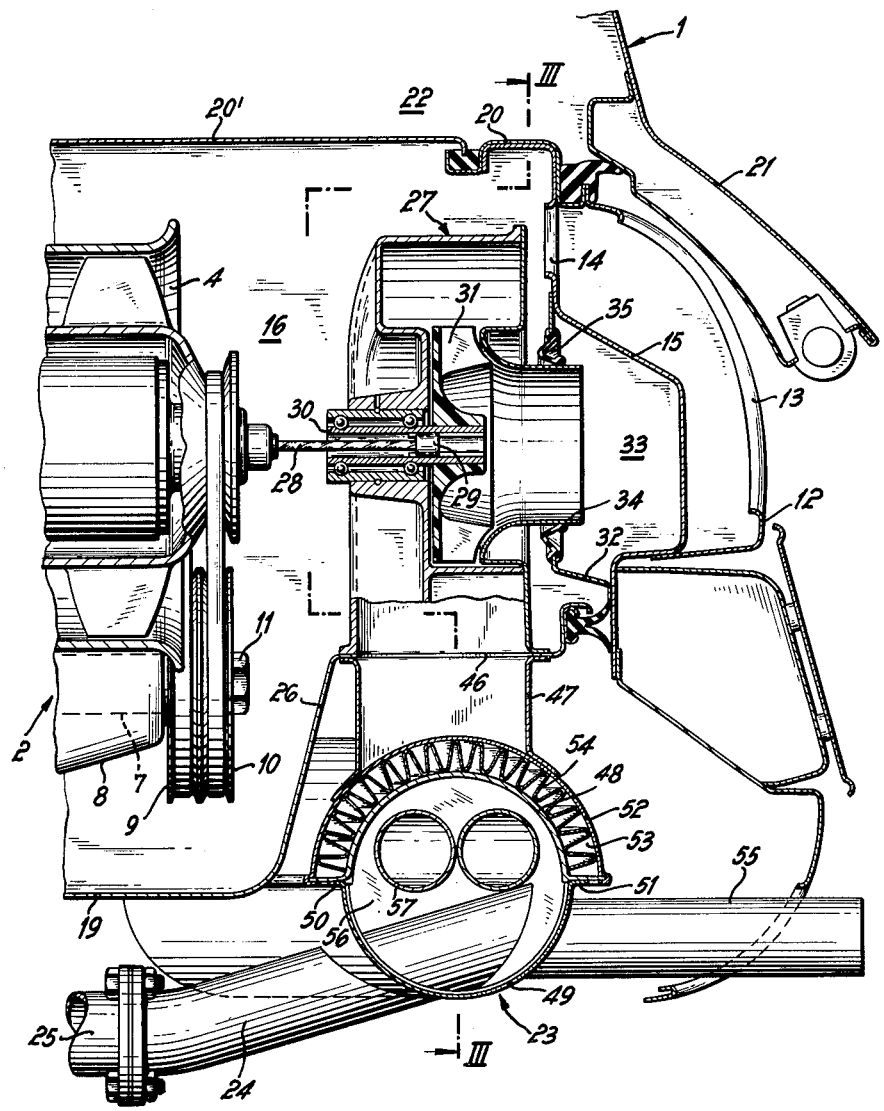
Figure 3:
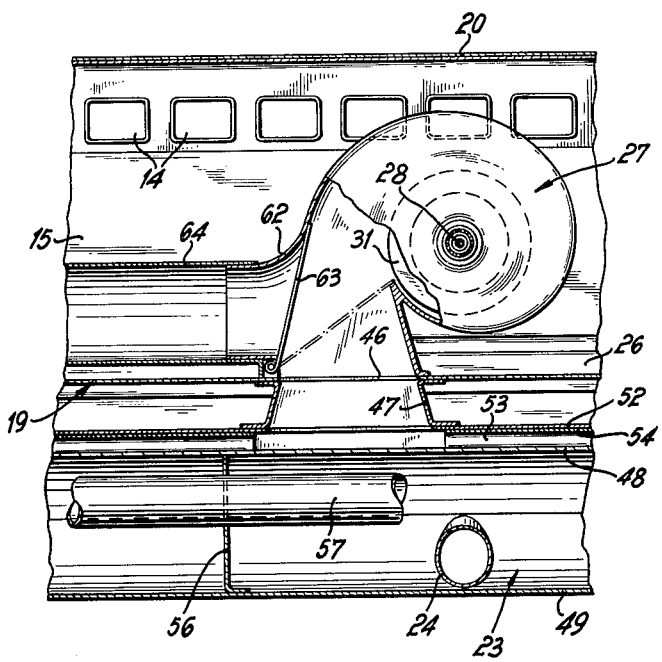

These and other objects, features and advantages of the present invention will become more obvious from the following description when taken in connection with the accompanying drawing which shows, for purposes of illustration only, one embodiment in accordance with the present invention and wherein FIGURE 1 is a partial top plan view of a passenger motor vehicle provided with an air-cooled, internal combustion engine accommodated in the rear part of the vehicle and provided with a heating installation for the passenger space in accordance with the present invention, FIGURE 2 is a cross-sectional view taken along line II—II of FIGURE 1, and FIGURE 3 is a cross-sectional view, on a reduced scale, taken along line III—III of FIGURE 2.

Referring now to the drawing wherein like reference numerals are used throughout the various views to designate like parts, reference numeral 1 generally designates in FIGURES 1 and 2 a motor vehicle having as drive unit an internal combustion engine 2 which is accommodated within the rear portion of the vehicle. The internal combustion engine 2 is constructed as air-cooled engine and may have any known conventional construction as well as any known conventional arrangement of the cylinders. In the illustrated embodiment, the internal combustion engine 2 is provided with two cylinder rows which are disposed horizontally opposite each other. One cooling-air blower 3, 4 is coordinated to a respective row of cylinders which supply, in a conventional manner, the cooling air through air-distributing housings 5 and 6 to the individual rows of cylinders. Each cooling blower 3 and 4 is suitably driven from the engine crankshaft 7 (FIGURE 2). For that purpose, two belt pulleys 9 and 10 are secured by means of a bolt or nut 11 and, for example, by a splined connection (not shown in detail in the drawing) to the end of the crankshaft 7 extending beyond the crankshaft housing 8, whereby one belt pulley 9 drives the blower 3 by means of an appropriate V-belt and the other belt pulley 10 the blower 4 also by means of an appropriate V-belt.

A plurality of vertically extending slots 13 are provided for the supply of air to the cooling-air blowers 3 and 4 in the outer walls of the motor vehicle 1 and more particularly in the rear cover panel 12. The cooling air reaches the engine space 16 through these slots 13 as well as through further apertures 14 provided in cross-bearer member 15 of the vehicle frame or of the vehicle body of a self-supporting type body construction. The cooling-air blowers 3 and 4 draw-in air out of this space 16.

The engine space is defined aside from the aforementioned cross-bearer member 15 at the end of the vehicle, additionally along the sides thereof by the inner wheel casing walls 17 and 18, and a protective panel 19 extends below the internal combustion engine 2 which may possibly be provided with outlet apertures (not shown) for the warmed-up cooling air, depending on the construction of the air-guide system to the cylinders of the internal combustion engine as well as of the exhaust lines of the warmed-up cooling air. A cover panel 20 extends above the internal combustion engine 2 which forms simultaneously the floor of a luggage space 22 provided above the internal combustion engine and accessible from the outside through a lid or cover 21. A portion 20' of the cover panel 20 is constructed to be removable so that after removal of the part 20' the internal combustion engine becomes freely accessible (FIGURE 2).

Additionally, an exhaust-gas muffler generally designated by reference numeral 23 is accommodated within the area of the rear part of the motor vehicle which muffler 23 is connected in a conventional manner through lines 24 with the exhaust manifolds 25 of each cylinder row. The exhaust-gas muffler 23 is shielded against the engine space 16 by the protective panel 19 which forms by the pressed-out portion 26 thereof a recess for the accommodation of the exhaust-gas muffler.

A further blower 27 is connected coaxially to the cooling-air blower 4 which further blower 27 is connected with the cooling-air blower 4 through a flexible shaft 28. The blower 27, that is, the housing thereof, is secured at the protective panel 19 and more particularly at the pressed-out portion 26 thereof. The shaft 28 is provided with a splined shaft piece 29 which slidingly engages in a correspondingly constructed bushing 30 of the blower rotor 31. The rotor 31 is preferably made of plastic material, and the bushing or sleeve 30 is molded advantageously together with the rotor 31 during molding of the latter. Not only a simple an inexpensive construction is produced by such an arrangement but also any subsequent machining is dispensed with thereby. The molding of the sleeve 30 also dispenses with the provision of further securing means for fastening the rotor 31.

The cross-bearer member 15 is pressed out in a U-shaped manner and is completed by means of a closure panel 32 into a box-shaped bearer. The connecting member 34 of the blower 27 extends into the hollow space 33 of the box-shaped member whereby the place where the connecting member 34 extends through closure panel 32 is sealed in an air-tight manner by means of a seal 35.

The cross-bearer member 15 together with the closure panel 32 extends up to the inner wheel-casing walls 17 and 18, respectively. Lines 36 and 37 extend within the wheel casings, i.e., on the side of the wheel-casing walls opposite the engine space 16, which lines 36 and 37 are constituted, respectively, by the inner wheel-casing walls 17 and 18 and one additional pressed part 38 and 39, respectively. These lines 36 and 37 are in communication through apertures 40 and 41 provided in the wall parts 17 and 18 with the hollow space 33 of the cross-bearer member 15. On the other hand, the lines 36 and 37 extend up to the inlet slots 42 and 43 provided in the outer panels of the vehicle body which, in the illustrated embodiment, are provided in the pressed roof part 44, and more particularly below the rear window 45. By the use of such an arrangement, fresh air is drawn-in by the blower within a zone which has a relatively low dust content.

The fresh air drawn-in by the blower 27 through the lines described hereinabove is conducted through an aperture 46 provided in the protective panel 26 and through a short connecting line 47 to the exhaust-gas muffler 23 which, according to the present invention, is constructed as a heat-exchanger.

The exhaust-gas muffler generally designated by reference numeral 23 is composed of two half-shells 48 and 49, respectively (FIGURE 2), which have approximately a cylindrical base shape in cross section. The half-shells 48 and 49 are provided along the rim portions thereof with angularly bent flanges 50 and 51 which serve for the connection of the two half-shells 48 and 49 with each other. These flanges 50 and 51 in the respective half-shells 48 and 49 are so constructed and arranged that the separating plane between the half-shells 48 and 49 in the installed condition of the muffler 23 is disposed in a horizontal plane. The upper half-shell 48 is thereby made of a considerably stronger material than is usual and forms a heat-exchanger surface for the air supplied by the blower 27 to the exhaust-gas muffler 23. Additionally, a correspondingly curved cover panel 52 extending at a distance from the half-shell 48 is arranged at the half-shell 48 and is secured at the flanges of the upper half-shell 48 by the bent rim portions thereof. An undulated reinforcement 54 is accommodated within the space 53 between the half-shell 48 and the cover panel 52.

All connections, that is, the inlet and outlet connecting members 24 and 55 as well as the cross walls 56 accommodated within the muffler 23 which carry the muffler pipes 57 are secured at the lower half-shell 49 of the muffler 23. As a result thereof, the welded or soldered places for the securing of the lines and of the muffler are provided exclusively at the lower half-shell 49 so that the upper half-shell which constitutes the heat-exchanger surface is free of any connections which possibly might crack and cause a flow of exhaust gases into the heating air system.

The exhaust-gas muffler 23 is additionally constructed in an arcuately shaped curved manner. As may be seen from FIGURE 1, the two ends of the exhaust-gas muffler 23 are bent toward the passenger space whereby there is achieved not only a better adaptation of the muffler to the outer body walls of the motor vehicle but also a favorable effect of the flow of the heated air in the direction toward the passenger space of the vehicle.

The air supplied by the blower 27 to the space 53 of the heat-exchanger is heated along the wall part 48 of the exhaust-gas muffler 23 and reaches through the connecting members 58 and 59 provided in the cover panel 52 the lines 60 and 61 which lead to the passenger space (FIGURE 1). The heater lines 60 and 61 are represented in the illustrated embodiment as separate structural parts which extend along the wall panels of the body. However, it is also possible to accommodate these heater lines in bearer members or bearer-type parts of a self-supporting type body or within parts thereof or to construct these bearer members directly as heater lines.

Additionally, there exists the possibility to branch off the fresh air supplied by the blower 27 ahead of the heat-exchanger and to supply the fresh air directly to the line 60 and/or 61 leading to the passenger space in by-passing relationship to the heat-exchanger (FIGURE 3). For that purpose, a valve 63 is provided within the housing of the blower 27, and more particularly in the inlet connection 62 thereof by means of which the air flow is deflected in a position of valve 63 shown in FIGURE 3 in dot-dash line, instead of to the heat-exchanger, into a separate line 64 (FIGURES 1 and 3). This line 64 for the fresh air extends above the exhaust-gas muffler 23 and terminates in the line 60 and/or 61 or in the connecting member 58 and/or 59 leading to the passenger space. By such an arrangement, it is possible to supply cool air or heated air as well as a mixture of cool and heated air to the passenger space, depending on the position of the valve 63.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A heating installation for vehicles, especially motor vehicles having a body comprising enclosure means, said vehicles having an air-cooled, internal combustion engine having a free end and provided with cooling-air blower means driven by the engine and muffler means connected with the exhaust manifold of the engine, comprising means for supplying heated air to said enclosure means including separate heater blower means arranged at said free end of the internal combustion engine approximately coaxially to and directly in front of the cooling-air blower means, flexible shaft means connecting said cooling air blower means with said separate heater blower means, said muffler means being constructed as a heat-exchanger having a heat-exchanger part and disposed directly below said separate heater blower means, and means connecting said heater blower means with said muffler means to supply fresh air along the heat-exchanger part of said muffler means, and air passage means connecting said heat exchanger and said enclosure means.

2. A heating installation for vehicles, especially motor vehicles having a body comprising enclosure means, said vehicles further comprising an air-cooled, internal combustion engine having a free end and provided with cooling-air blower means driven by the engine and muffler means connected with the exhaust manifold of the engine, said body having body walls adjacent said cooling air blower means, said installation comprising means for supplying heated air to said enclosure means including separate heater blower means arranged at the free end of the internal combustion engine approximately coaxially to and directly in front of the cooling-air blower means, flexible shaft means connecting said cooling-air blower means with said separate heater blower means, said muffler means being constructed as a heat-exchanger having a heat-exchanger part and disposed directly below said separate heater blower means, and means connecting said heater blower means with said muffler means to supply fresh air along the heat-exchanger part of said muffler means, first duct means connected to said cooling-air blower means and second duct means connected to said heater blower means, the air reaching said cooling-air blower means through said first duct means and through slots provided in said outer body walls, and the air reaching said heater blower means through said second duct means, said second duct means being formed by parts of said body, and air passage means connecting said heat exchanger with said enclosure means.

3. A heating installation for vehicles, especially motor vehicles having a body comprising enclosure means, cross bearer means in the rear part of the vehicle and an air-cooled, internal combustion engine having a free end in said rear part and provided with cooling-air blower means driven by the engine and muffler means connected with the exhaust manifold of the engine, said body having outer body walls adjacent said cooling air blower means, said installation comprising means for supplying heated air to said enclosure means including separate heater blower means arranged at said free end of the internal combustion engine approximately coaxially to and directly in front of the cooling-air blower means, flexible shaft means connecting said cooling-air blower means with said separate heater blower means, said muffler means being constructed as a heat-exchanger having a heat-exchanger part and disposed directly below said separate heater blower means, and means connecting said heater blower means with said muffler means to supply fresh air along the heat-exchanger part of said muffler means, first duct means connected to said cooling-air blower means and second duct means connected to said heater blower means, the air reaching said cooling-air blower means through said first duct means and through slots provided in said outer body walls, and the air reaching said heater blower means through said second duct means which are formed by parts of said body, and cross bearer means including a cross bearer member having a closed profile and forming a portion of the said second duct means leading to said heater blower means, and air passage means connecting said heat-exchanger and said enclosure means.

4. A heating installation for vehicles, especially motor vehicles having a body comprising enclosure means, said vehicles being provided with outer body panels, cross bearer means in the rear part of the vehicle and an air-cooled, internal combustion engine having a free end in said part and provided with cooling-air blower means driven by the engine and muffler means connected with the exhaust manifold of the engine, said body including inner vehicle wheel housing walls and having outer body walls adjacent said blower means, said installation comprising means for supplying heated air to said enclosure means including separate heater blower means arranged at said free end of the internal combustion engine approximately coaxially to and directly in front of the cooling-air blower means, flexible shaft means connecting said cooling-air blower means with said separate heater blower means, said muffler means being constructed as a heat-exchanger having a heat-exchange part and disposed directly below said separate heater blower means, and air passage means connecting said heater blower means with said muffler means to supply fresh air along the heat-exchange part of said muffler means, first duct means connected to said cooling-air blower means and receiving air through slots provided in said outer body walls, second duct means conducting air to said heater blower means, said cross bearer means being constructed as a bearer member having a closed profile and forming a portion of the said second duct means leading to said heater blower means, the said second duct means including a further duct portion in communication with the portion of said duct means constituted by said cross bearer means, said further duct portion including one of said inner vehicle wheel housing walls and being operatively connected with air inlet apertures provided in the upper walls of said outer body panels, and air passage means connecting said heat-exchanger and said enclosure means.

5. A heating installation for vehicles, especially motor vehicles having a body comprising enclosure means, said vehicles being provided with body panels and an air-cooled, internal combustion engine provided with cooling-air blower means driven by the engine and muffler means connected with the exhaust manifold of the engine, said body having outer body walls adjacent said blower means, said installation comprising means for supplying heated air to the space including separate heater blower means, said muffler means being constructed as a heat-exchanger having a heat-exchange surface and disposed directly below said separate heater blower means, and means connecting said separate heater blower means with said muffler means to supply fresh air along said heat-exchange surface of said muffler means, separate duct means connected to said cooling air blower means and to said heater blower means, said separate duct means comprising first duct means supplying air to said cooling air blower means, slots in said outer body walls admitting air to said first duct means, said separate duct means including second duct means supplying air to said heater blower means, said second duct means being formed at least in part by parts of said body, and air passage means connecting said heat-exchanger and said enclosure means.

6. A heating installation for vehicles, especially motor vehicles having a body comprising enclosure means, said vehicles being provided with outer body panels, cross bearer means in the rear part of the vehicle and an air-cooled, internal combustion engine in said rear part provided with cooling-air blower means driven by the engine and muffler means connected with the exhaust manifold of the engine, said body including inner vehicle wheel housing walls and having outer body walls adjacent said blower means, said installation comprising means for supplying heated air to the space including separate heater blower means, said muffler means being constructed as a heat-exchanger having a heat-exchange surface and disposed directly below said separate heater blower means, and means connecting said separate heater blower means with said muffler means to supply fresh air along the heat-exchange surface of said muffler means, first duct means connected to said cooling air blower means and second duct means connected to said heater blower means, the air reaching said cooling-air blower means via said first duct means through slots provided in said outer body walls, and the air reaching said heater blower means via said second duct means, said cross bearer means being constructed as a bearer member having a closed profile and forming a portion of the said second duct means leading to said heater blower means, the said second duct means including a further duct portion in communication with the portion of said duct means constituted by said cross bearer means, said further duct portion including one of said inner vehicle wheel housing walls and being operatively connected with air inlet apertures provided in the upper walls of the outer body panels, and air passage means connecting said heat-exchanger and said enclosure means.

7. In a heating and ventilating system for a motor vehicle having a body comprising enclosure means, said vehicle further having an air-cooled, internal combustion engine provided with cooling air blower means and an exhaust-gas muffler means, and said heating and ventilating system including its own blower means, the improvement essentially consisting of constructing said muffler means as a heat-exchanger having a heat-exchange part and located directly below the blower means of the heating and ventilating system, and means in said ventilating system including the blower means thereof for supplying fresh air along said heat-exchanger part of said muffler means to thereby heat the fresh air by the thermal energy contained within the exhaust gases, said last-mentioned blower means being located substantially coaxially to the cooling air blower means directly in front of said cooling-air blower means and flexible shaft means for driving the blower means of said heating and ventilating system by said cooling air blower means, and air passage means connecting said heat-exchanger and said enclosure means.

8. A heating installation for vehicles, especially motor vehicles, having enclosure means and an internal combustion engine having a free end and provided with muffler means connected with the exhaust manifold of the engine, comprising means for supplying to said enclosure means air heated by the exhaust gases of the engine including separate blower means arranged at said free end of the internal combustion engine, said muffler means being constructed as a heat-exchanger having a heat-exchange part and disposed directly below said separate blower means, and means operatively connecting said separate blower means with said muffler means to supply fresh air along said heat-exchange part of said muffler means, said muffler means including two approximately cylindrically shaped half-shells of which only one serves as a heat exchange surface, the separating plane between said two half-shells being disposed substantially horizontally and said heat exchange surface being constituted by the upper half shell, said upper half-shell being made of a material having considerably greater strength than the material of the lower half-shell, and air passage means connecting said heat-exchanger and said enclosure means.

9. A heating installation for vehicles, especially motor vehicles, having enclosure means and an internal combustion engine having a free end and provided with muffler means connected with the exhaust manifold of the engine, comprising means for supplying to said enclosure means air heated by the exhaust gases of the engine including separate blower means arranged at said free end of the internal combustion engine, said muffler means being constructed as a heat-exchanger having a heat-exchange part and disposed directly below said separate blower means, and means operatively connecting said separate blower means with said muffler means to supply fresh air along said heat-exchange part of said muffler means, said muffler means including two approximately cylindrically shaped half-shells of which only one serves as a heat exchange surface, the separating plane between said two half-shells being disposed substantially horizontally and said heat exchange surface being constituted by the upper half shell, said upper half-shell being made of a material having considerably greater strength than the material of the lower half-shell, the connections by the exhaust manifold and the tail pipe at said muffler means thereof being arranged exclusively at said lower half shell, and air passage means connecting said heat-exchanger and said enclosure means.

10. In a heating and ventilating system for the passenger enclosure means of a motor vehicle having an air-cooled, internal combustion engine provided with cooling air blower means and an exhaust-gas muffler means, and said heating and ventilating system including its own blower means, the improvement essentially consisting of constructing said muffler means as a heat-exchanger having a heat-exchanger part and located directly below the blower means of the heating and ventilating system, and means in said ventilating system including the blower means thereof for supplying fresh air along said heat-exchanger part of said muffler means to thereby heat the fresh air by the thermal energy contained within the exhaust gases, means including separate suction lines connected, respectively, to said cooling-air blower means and the blower means of said heating and ventilating system, the air reaching said cooling air-blower means through slots provided in the outer body walls of the vehicle adjacent said last-mentioned blower means and through a respective suction line, and the air reaching the blower means of the heating and ventilating system through the other suction line formed at least in part by portions of the vehicle body, and heater line means connecting said heat-exchanger and said enclosure means.

11. A heating installation for vehicles, especially motor vehicles having enclosure means and an air-cooled, internal combustion engine having a free end and provided with cooling-air blower means driven by the engine and muffler means connected with the exhaust manifold of the engine, comprising means for supplying fresh, heated air to said enclosure means including heater blower means arranged at said free end of the internal combustion engine approximately coaxially to the cooling air blower means, flexible shaft means connecting said cooling air blower means with said heating blower, said muffler means being constructed as a heat-exchanger disposed directly below said heating-blower means, and including two half-shells of substantially cylindrical base shape, only one of said half-shells serving as heat exchange surface, the separating plane between said half-shells being disposed approximately in a horizontal plane, said heat-exchange surface being formed by the upper half shell which is made of a material having considerably greater strength than the material of the lower half shell, the connections of the exhaust manifold and tail pipe lines disposed within said muffler means being secured exclusively at the lower half shell, and means connecting said heater blower means with said muffler means to supply fresh air along said heat-exchange surface of said muffler means, and air passage means connecting said heat-exchanger and said enclosure means.

12. A heating installation for vehicles, especially motor vehicles having a body comprising enclosure means adapted to receive passengers, said body being provided with outer body panels, cross bearer means in the rear part of the vehicle and an air-cooled, internal combustion engine having a free end in said rear part and provided with cooling-air blower means driven by the engine and muffler means connected with the exhaust manifold of the engine, said body including inner vehicle wheel housing walls and having outer body walls adjacent said blower means, said installation comprising means for supplying heated air to the space including separate heater blower means arranged at said free end of the internal combustion engine approximately coaxially to and directly in front of the cooling air blower means, flexible shaft means connecting said cooling air blower means with said separate heater blower means, said muffler means being constructed as a heat-exchanger having a heat-exchange part and disposed directly below said separate heater blower means, and means connecting said separate heater blower means with said muffler means to supply fresh air along said heat-exchange part of said muffler means, first duct means connected to said cooling air blower means and second duct means connected to said heater blower means, the air reaching said cooling air blower means via said first duct means through slots provided in said outer body walls, and the air reaching said heater blower means via said second duct means, said cross bearer means being constructed as a bearer member having a closed profile, and forming a portion of the said second duct means leading to said heater blower means, the said second duct means including a further duct portion in communication with the portion of said duct means constituted by said cross bearer means, said further duct portion including one of said inner wheel vehicle housing walls and being operatively connected with air inlet apertures provided in the upper walls of the outer body panels, and said muffler means including two half-shells of substantially cylindrical base shape, only one of said half-shells serving as a heat exchange surface, the separating plane between said half-shells being disposed approximately in a horizontal plane, said heat-exchange surface being formed by the upper half shell which is made of a material having considerably greater strength than the material of the lower half shell, the connections of the exhaust manifold and tail pipe lines disposed within said muffler means being secured exclusively at the lower half-shell, and said muffler means being arcuately curved toward said enclosure means and air passage means connecting said enclosure means and said heat-exchanger.

References Cited by the Examiner

UNITED STATES PATENTS

| | | | |
|---|---|---|---|
| 1,332,327 | 3/20 | Eastwood | 165—52 |
| 1,883,452 | 10/32 | Armstrong | 237—12.3 |

FOREIGN PATENTS

| | | |
|---|---|---|
| 469,648 | 7/37 | Great Britain. |
| 507,504 | 6/39 | Great Britain. |

OTHER REFERENCES

Vogelsang, German printed application No. 1,109,450, June 1961.

German printed application No. 1,124,839, March 1962.

EDWARD J. MICHAEL, *Primary Examiner.*

JAMES W. WESTHAVER, *Examiner.*